United States Patent Office 3,299,920
Patented Jan. 24, 1967

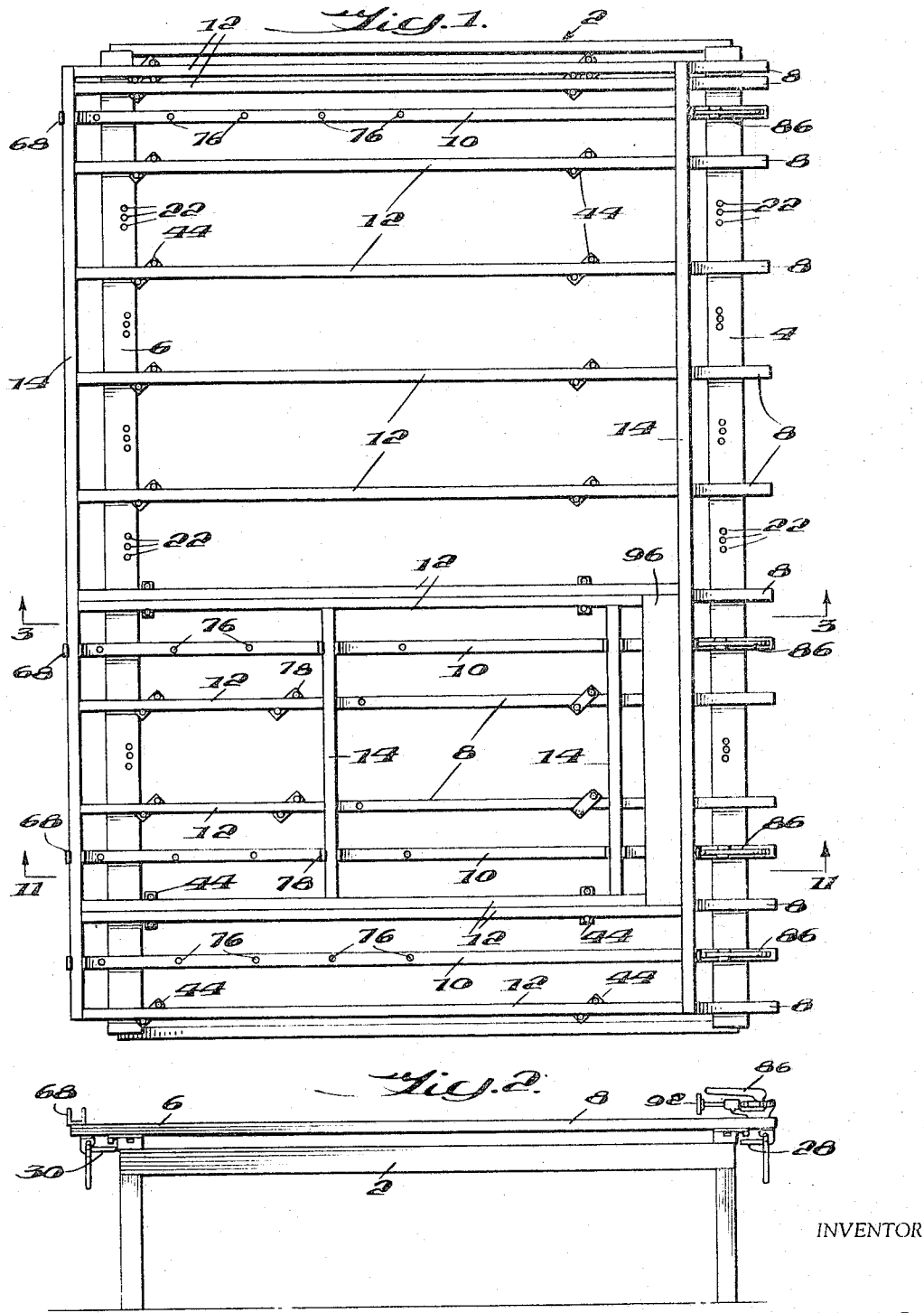

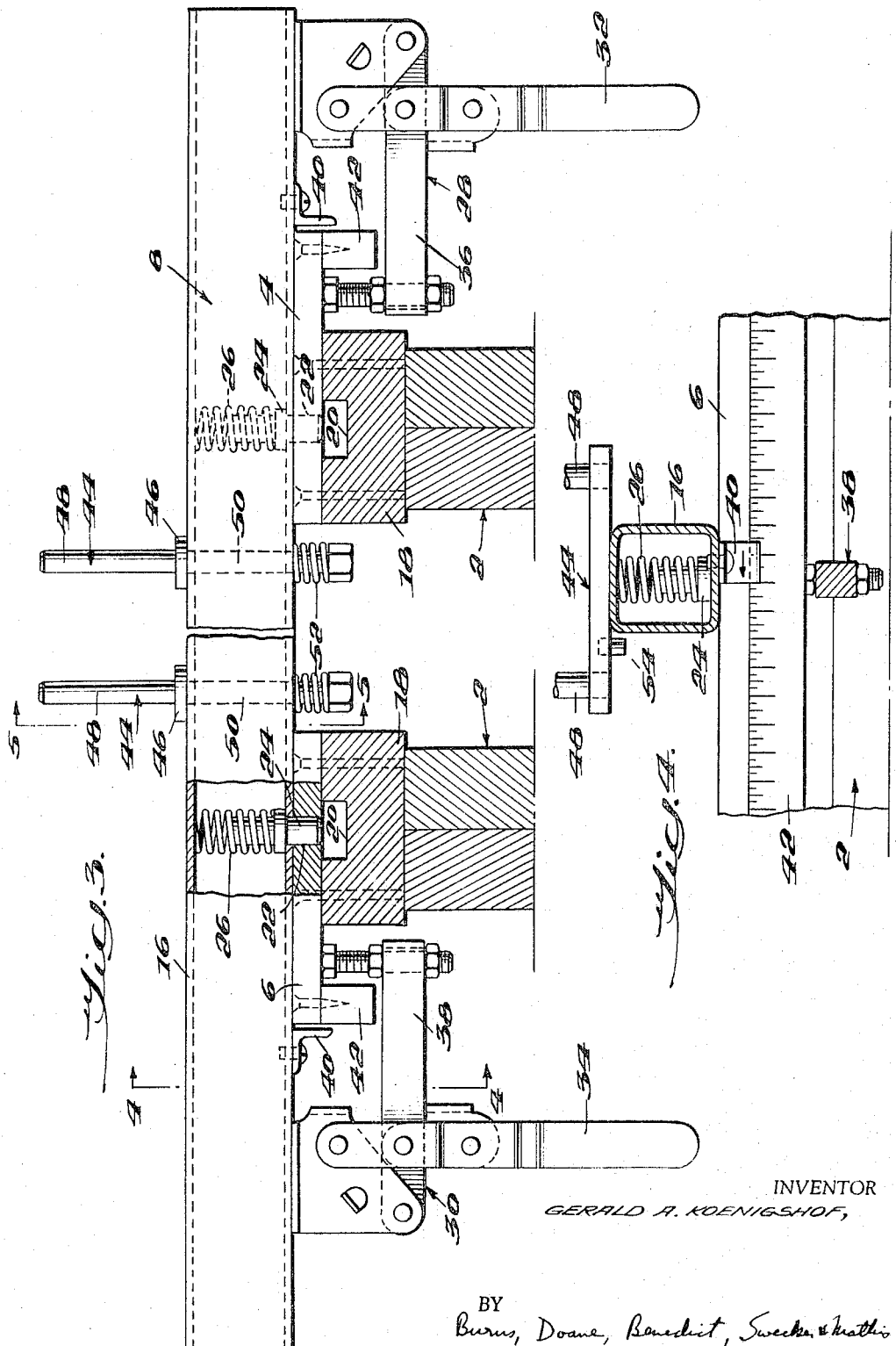

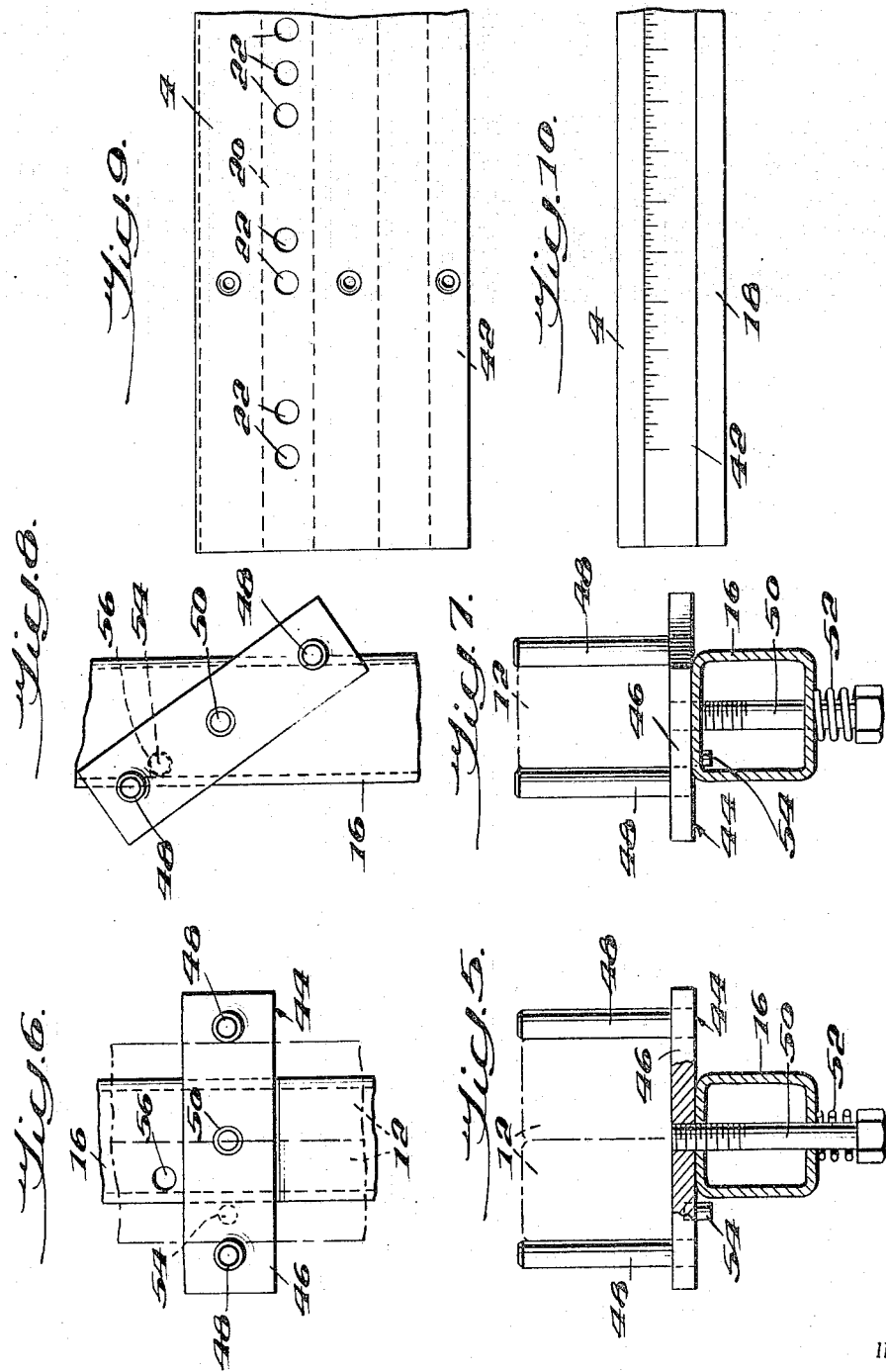

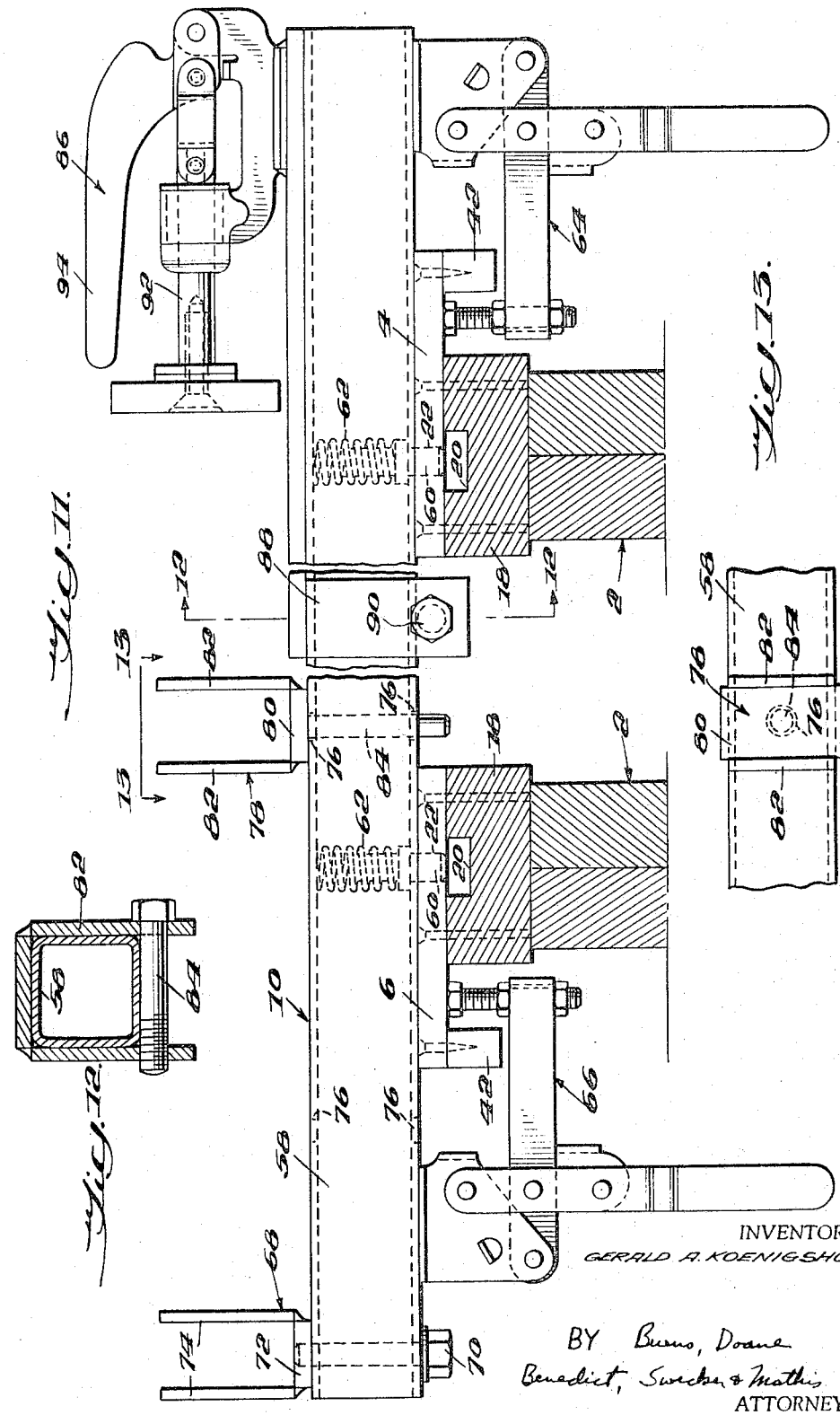

3,299,920
APPARATUS FOR FABRICATING WOOD
BUILDING COMPONENTS
Gerald A. Koenigshof, Kensington, Md., assignor to
Timber Engineering Company, Washington, D.C., a
corporation of Delaware
Filed Oct. 30, 1963, Ser. No. 320,129
18 Claims. (Cl. 144—288)

This invention relates to apparatus for assembling wood building components and more particularly to a fixture for assembling and fabricating wall panels.

Walls of conventional wood buildings, such as houses, are usually constructed by skilled carpenters. The studs and sills are individually located and nailed together to form the walls of the building. Windows and doors are also individually framed in the walls.

Prefabricated wall panels produced at a plant and shipped to the building site have reduced the amount of skilled labor required for large buildings. Prefabricated wall panels are only economical, however, if there is a large enough volume produced to justify the investment in the equipment and the transportation cost of the large wall panels.

The small home builder, for example, cannot take advantage of the savings of prefabricated wall panels, since his customers require variety from one house to the next in a tract. In order to provide this variety in house designs, it is often necessary to utilize many different sizes and types of wall panels and the standard prefabricated wall panels do not provide the versatility that the builder requires.

Attempts have been made to adapt prefabrication techniques to assembly fixtures for individual builders, but these fixtures have not been found to be practical. In order for a wall panel fixture to be of value to the builder at the building site, the initial cost of the fixture must be small and the fixture must be readily movable to another location when the building is finished. It is also important that the fixture be capable of producing many different styles and sizes of wall sections, with a minimum of skilled labor.

In view of the defects in the prior art prefabricating fixtures, it is an object of this invention to provide a fixture for fabricating wood wall sections which is capable of producing a wide variety of sizes and arrangements of the wall members.

It is a further object of this invention to provide a fixture which is adjustable for fabricating panels of different sizes and shapes.

It is another object of this invention to provide a fixture which is rapidly and accurately adjusted for assembly of the members in the desired pattern.

It is a still further object of this invention to provide a fixture for accurately locating and forming a door or window opening in a wall panel.

Another object of this invention is to provide a fixture which may be conveniently transported from one location to another.

According to a preferred embodiment of the invention, a pair of locator plates are mounted in parallel relation on the top surface of a table or other support. A plurality of bars are positioned on the plates and clamped at their opposite ends to the respective locator plates. The bars are provided with brackets for supporting either stud members or sill members. The stud supporting brackets may be swung between two positions for holding either a single stud or a double stud. The sill holding brackets having sockets therein for receiving sill members which extend substantially parallel to the locator plates. One end of each sill holding bar is provided with a moveable plunger in position for cooperating with an adjacent sill member to urge the studding in the fixture toward the opposite end of the bar.

Holes or sockets are formed in the locator plates at spaced intervals and pins on the bars cooperate with the holes for selective positioning of the bars. The bars are individually removable from the table and may be mounted on the table for assembling a wall panel having the studs and sill members arranged in any desired pattern and for any size of panel. The combination of the sockets in the locator plates and the clamps on each of the holders assures that the assembly apparatus of this invention is capable of producing accurate and uniform wall panels.

This preferred embodiment of the invention is illustrated in the accompanying drawings in which:

FIG. 1 is a schematic top plan view of the assembly apparatus of this invention mounted on a table;

FIG. 2 is an end view of the apparatus in FIG. 1;

FIG. 3 is an enlarged cross-sectional view along the line 3—3 in FIG. 1 showing a stud holder with the wood members removed;

FIG. 4 is a cross-sectional view of the stud holder along the line 4—4 of FIG. 3;

FIG. 5 is a cross-sectional view of the stud holder along the line 5—5 in FIG. 3;

FIG. 6 is a top plan view of the stud holder as in FIG. 5;

FIG. 7 is a cross-sectional view of a stud holder as in FIG. 5, but with the stud bracket rotated for holding a single stud;

FIG. 8 is a top plan view of the stud holder as in FIG. 7;

FIG. 9 is a detailed plan view of the locator plate;

FIG. 10 is a front elevational view of the portion of the locator plate shown in FIG. 9;

FIG. 11 is an enlarged cross-sectional view along the line 11—11 in FIG. 1, showing a sill holder, with the wood members removed;

FIG. 12 is a cross-sectional view of the sill holder along the line 12—12 in FIG. 11; and FIG. 13 is a top plan view of a sill bracket as viewed along the line 13—13 in FIG. 11.

Referring to FIGS. 1 and 2, the assembly apparatus of this invention is mounted on a table 2. The table 2 does not form a part of the invention, but merely supports the apparatus at a conventient height for the workmen and provides a base or foundation for locator plates 4 and 6 which are secured along opposite sides of the table 2. A plurality of bars, which may be formed of square tubing, for example, extend between the locator plates. The bars are in the form of stud holders 8 and sill holders 10. As shown in FIG. 1, stud members 12 and sill members 14 are supported on the respective stud holders 8 and sill holders 10 to form a typical wall section. The wall panel section which is shown in FIG. 1 has a window frame adjacent one end and at the opposite end of the panel two closely spaced stud members 12 are provided for forming a corner with an adjacent wall panel.

A typical stud holder 8 is shown in FIG. 3. A bar 16, which is formed of square tubing having a length greater than the width of the table 2, is supported on the locator plates 4 and 6. The plates 4 and 6 are mounted on planks 18 which extend along the opposite edges of the table 2. A longitudinal groove 20 extends along the top of each of the planks 18 adjacent the plates 4 and 6. A plurality of holes 22 are also provided, spaced at intervals along the length of the plates 4 and 6 over the grooves 20. A pin 24 is mounted in the bar 16 at each opposite end of the bar and is biased toward an extended position by a spring 26. The holes 22 in the locator plates 4 and 6 are arranged at appropriate locations, so that when the pins 24 ar engaged in corresponding holes 22 in the locator plates 4 and 6, the bar 16 extends at right angles to the locator plates. The opposite ends of the bar 16 are secured to the locator plates 4 and 6 by means of clamps 28 and 30. The clamps 28 and 30 each have a handle 32 and 34, respectively, which swings away from the table 2 to lower the respective clamp arms 36 and 38, thereby releasing the bar 16 from the table.

A tab 40 is fastened to each opposite end of the bar 16 adjacent to the outer edge of each of the locator plates 4 and 6. A scale 42 is secured along the edge of each of the locator plates 4 and 6 and, as shown in FIG. 4, the position of each end of the bar 16 on the table 2 can be accurately determined. If the bar 16 is not aligned with the holes 22, the pins 24 engage the surface of the respective locator plates 4 and 6. When the clamps 28 and 30 are applied, the pins 24 are inserted into the bar 16. Therefore, if the holes 22 are not used, the scales 42 can be used to insure that the stud holder 8 extends at right angles to the locator plates.

A plurality of stud brackets 44 are mounted along the length of the bar 16. The brackets 44 have a base 46 and upright pins 48, as shown in FIGS. 3 to 8. A bolt 50 extends through the bar 16 and is threaded into the base 46 of the bracket 44. A spring 52 is compressed between the bar 16 and the head of the bolt 50 for urging the base 46 against the top surface of the bar 16. A peg 54 is secured in the bottom surface of the base 46 for positioning the base. As shown in FIGS. 5 and 6, the peg 54 cooperates with the bar 16 to maintain the base 46 at right angles to the bar 16. When the base 46 of the bracket is rotated obliquely to the position shown in FIGS. 7 and 8, the peg 84 engages in a hole 86 in the bar 16. The spring 52 allows the base 46 to be raised away from the bar 60 sufficiently for swinging the base relative to the bar 16, so that the peg may be moved into registration with the hole 56. In the transverse position, as shown in FIGS. 5 and 6, the lateral distance between the pins 48 is sufficiently wide to receive two stud members 12 which are shown in phantom lines. The use of studs in this relation in the wall section is illustrated in FIG. 1 on the opposite sides of the window opening. When the base 46 is rotated, so that the pin 54 engages in the hole 56, as shown in FIGS. 7 and 8, the lateral distance between the pins 48 is reduced and only a single stud member 12 fits between the pins 48. Stud holding brackets 46 in this position are shown on the remaining stud holders in FIG. 1.

A typical sill holder 10 is shown in detail in FIGS. 11 to 13 and includes a bar 58 which is formed of a square tube. Pins 60 are mounted in the bar 58 at opposite ends thereof and each of the pins 60 is urged outwardly from the bar 58 by a spring 62 in the bar 58. The pins 60 engage in the holes 22 in the locator plates 4 and 6. Clamps 64 and 66 are secured to the oposite ends of the bar 58 and have substantially the same construction and operation as the clamps 28 and 30 of the stud holder 8.

A sill bracket 68 is secured to one end of the bar 58 by a bolt 70. The sill bracket 68 has a base 72 and sidewalls 74 extending upright along opposite edges of the base 72. A plurality of socket holes 76 are provided along the length of the bar 58 and a removable sill bracket 78 may be selectively inserted in the holes 76. The removable sill bracket 78 is substantially the same as the sill bracket 68, having a base 80 and sidewalls 82, except that a pin 84 is secured in the base 80 and engages in the holes 76. At the oposite end of the bar 58, a toggle clamp 86 is mounted on a bracket 88. The bracket is clamped to the bar 58, as shown in FIG. 11 by a bolt 90. The position of the bracket 88 and of the toggle clamp 86 may be adjusted by loosening the bolt 90 and sliding the bracket 88 along the bar 58 to the desired location and then tightening the bolt 90. The toggle clamp 86 has a plunger 92 which may be drawn away from the sill brackets 68 and 78 by raising the handle 94, or moved toward the sill brackets 68 and 78 by lowering the handle to the position shown in FIG. 11.

The locator plate 4 is illustrated in detail in FIGS. 9 and 10. A plurality of holes 22 are provided along the length of the plate 4 over the groove 20. The holes 22 are arranged in a particular relationship to the indicia on the scale 42. The holes 22 are arranged to provide commonly used spacing between stud members and in cooperation with the scale 42 the relative locations of the stud members may be accurately determined. The pins 24 and 60 in the stud holders and sill holders, respectively are spring-loaded and if in the desired location of the holders, the pins are not located over the holes 22, the pins are merely retracted into the hollow bars as the clamps 28 and 30, or 64 and 66 are applied to the bottom of the locator plates. It is usually not necessary that the lateral position of sill holders be accurately determined, but for dimensional accuracy the sill holders should extend at right angles to the locator plates. Therefore, it is important that the opposite ends of the sill holders are engaged in corresponding holes in the respective locator plates 4 and 6.

In order to form a wall section, such as is shown in FIG. 1, the stud holders 8 are mounted on the locator plates 4 and 6 with the pins 24 in the respective holes 22. The stud holders are fastened in position by the clamps 28 and 30. After all of the stud holders 8 are fastened in their desired positions the stud brackets 44 are oriented to receive either a single stud member or double stud members in accordance with FIGS. 8 and 6, respectively. At the opposite sides of the window in the wall section which is shown in FIG. 1, double stud members 12 are supported on a single stud holder 8. After all of the stud holders have been positioned on the locator plates 4 and 6, the sill holders 10 are mounted on the locator plates 4 and 6. The sill holders 10 may be mounted at any convenient position along the length of the plates, but it is desirable to have one sill holder adjacent each end of the wall section and two sill holders under a window opening or door opening. This arrangement of the sill holders is shown in FIG. 1. One end of each of the sill holders 10 is provided with a sill bracket 68 for supporting a lower sill member 14 of the wall section. Intermediate sill holders 78 are inserted in holes 76 at appropriate locations for supporting the horizontal members 14 which form the window opening in the wall section. A header 96 over the window opening abuts against a short stud member 12 on the opposite sides of the window opening. The top sill member 14 is installed after the stud members 12 and the other sill and horizontal members 14 have been installed in the fixture. The top sill member 14 abuts against the end of the stud members 12 and is clamped in position by means of the clamps 80 on each of the sill holders 10. When the clamps 80 have been applied, the entire wall section is tightly clamped together and as seen in FIG. 1, the joints between the sill members and stud members are exposed so that nails may be driven through the sills and into the ends of the stud members. Other types of fasteners also may be applied for securing the stud members and sill members together.

After the wood members of the wall section have been fastened together by nails or other securing devices, the clamps 80 are opened and the wall section may be lifted off of the clamping table 2 and another identical wall section may be fabricated, or a wall section having another configuration may be assembled by moving the appropriate stud holders or sill holders.

The holes 22 in the locator plates are formed at the most commonly used positions of the sill holders and stud holders, but if it is desired to assemble irregular or odd sized wall sections, the positions of the sill holders and stud holders may be located by referring to the scale 42. For convenience, the holes 22 on the locator plate may be marked with indicia for identifying certain sizes of wall panels which are commonly fabricated on the fixture. Also identifying indicia may be added to the scale 42 to facilitate mounting the sill holders and stud holders in the desired arrangement on the locator plates.

Since any number of stud holders or sill holders may be mounted on the locator plates, a wide variety of wall sections or other irregular sections may be fabricated on the fixture of this invention. The individual holders are light in weight, so that the fixture may be operated by a single workman, although it is preferred that the holders be installed by two workmen standing at opposite sides of the table 2. Since the locator plates 4 and 6 are removable from the table 2, as are the holders, the locator plates and the holders may be conveniently packaged and transported. The table 2 may be fabricated at the site. If it is found that longer wall panels are desired, the table 2 may be extended and longer locator plates may be installed on the table 2.

While this invention has been illustrated and described in one embodiment, it is recognized that variations and changes may be made therein without departing from the invention as set forth in the claims.

I claim:

1. An assembly fixture for wood frames comprising a table, a plurality of elongated bars, means for temporarily clamping the bars to the table, said bars extending across the table in substantially parallel relation to each other, at least one of said bars having means thereon for supporting a wood frame member extending along the bar, at least one other of said bars having means thereon for supporting a wood frame member extending transversely of the bar, and means on at least one of the bars for clamping the wood members together to form a wood frame.

2. An assembly fixture for wood frames comprising a table, a plurality of elongated bars, means on the bars for temporarily clamping the bars to the table, said bars extending across the table in substantially parallel relation to each other, brackets having upstanding sides for embracing a wood frame member, means for individually securing the brackets to the bars, said brackets on at least one of the bars being oriented at right angles to the brackets on at least one other bar, and means on at least one other of the bars for clamping the wood members together to form a wood frame.

3. An assembly fixture for stud members and sill members of a wood frame comprising a table, a plurality of sill holder bars, a plurality of stud holder bars, means for temporarily clamping the bars to the table, said bars extending across the table in substantially parallel relation to each other, means on each of the stud holder bars for supporting a stud member extending along each of said bars, means on each of said sill holder bars for supporting a sill member extending transversely of each of said bars, and means on each of the sill holder bars for clamping the wood members together to form a wood frame.

4. An assembly fixture for wood frames comprising a table, a plurality of elongated bars, means for locating the bars in predetermined positions on the table, means on the bars for temporarily clamping the bars to the table, said bars extending across the table in substantially parallel relation to each other, at least one of said bars having means thereon for supporting a wood frame member extending along the bar, at least one of said bars having means thereon for supporting a wood frame member extending transversely of the bar, and means on at least one of the bars for clamping the wood members together to form a wood frame.

5. An assembly fixture for wood frames comprising a table, a plurality of elongated bars, positioning means extending along opposite edges of the table, said positioning means having a plurality of holes therein spaced along the length thereof, projection means on said bars in position for engaging in said holes, means on the bars for temporarily clamping the bars to the table, said bars extending across the table in substantially parallel relation to each other, at least one of said bars having means thereon for supporting a wood frame member extending along the bar, at least one of said bars having means thereon for supporting a wood frame member extending transversely of the bar, and means on at least one of the bars for clamping the wood members together to form a wood frame.

6. An assembly fixture for wood frames comprising a table having a top, a pair of locator plates extending along opposite edges of said top, said locator plates having a plurality of holes spaced along the length thereof, said holes in one of said plates and the corresponding holes in the other of said plates each being aligned on an axis extending at right angles to the locator plates, a plurality of elongated bars, pins on said bars for engaging in said aligned holes, means on the bars for temporarily clamping the bars to the table, at least one of said bars having means thereon for supporting wood frame member extending along the bar, at least one of said bars having means thereon for supporting a wood frame member extending transversely of the bar, and means on at least one of the bars for clamping the wood members together to form a wood frame.

7. An assembly fixture for wood frames comprising a table having a top, a pair of locator plates extending along opposite edges of said top, said locator plates having a plurality of holes spaced and in alignment along the length thereof, said holes in one of said plates and the corresponding holes in the other of said plates each being aligned on an axis extending at right angles to the locator plates, a plurality of elongated bars, pins on said bars for engaging on said aligned holes, said pins being retractable into said bars and having spring means thereon yieldably urging the pins out of said bars, means on the bars for temporarily clamping the bars to the table, at least one of said bars having means thereon for supporting a wood frame member extending along the bar, at least one of said bars having means thereon for supporting a wood frame member extending transversely of the bar, and means on at least one of the bars for clamping the wood members together to form a wood frame.

8. In a fixture for assembling stud members and sill members to form a wood frame, a sill holder comprising an elongated bar, a clamp on each opposite end thereof having a clamping member cooperating with one side of the bar clamping a support therebetween, a sill bracket at one end of the bar and clamp means mounted on the opposite end of the bar having a pushrod movable toward the sill bracket.

9. In a fixture for assembling stud members and sill members to form a wood frame, a sill holder comprising an elongated bar, a clamp on each opposite end thereof having a clamping member cooperating with one side of the bar for clamping a support therebetween, a sill bracket at one end of the bar, a base mounted on the opposite end of the bar on the side opposite the clamp, a pushrod mounted on the base for reciprocating movement relative to the bracket and means for moving the pushrod whereby frame members are clamped between the bracket and the pushrod.

10. In a fixture for assembling stud members and sill members to form a wood frame, a sill holder comprising an elongated bar, a clamp on each opposite end thereof having a clamping member cooperating with one side of the bar for clamping a support therebetween, a sill bracket at one end of the bar, said bar having a plurality of holes therein spaced from the bracket, an auxiliary bracket mounted in the holes, and clamp means mounted on the opposite end of the bar having a pushrod movable toward the sill bracket.

11. In a fixture for assembling stud members and sill members to form a wood frame, a sill holder comprising an elongated bar, a clamp on each opposite end thereof having a clamping member cooperating with one side of the bar for clamping a support therebetween, a sill bracket at one end of the bar, a base mounted on the opposite end of the bar on the side opposite the clamp, means for adjusting the distance between the pushrod and the base, a pushrod mounted on the base for reciprocating movement relative to the bracket and means for moving the pushrod whereby frame members are clamped between the bracket and the pushrod.

12. In a fixture for assembling stud members and sill members to form a wood frame, a sill holder comprising an elongated bar, a clamp on each opposite end thereof having a clamping member cooperating with one side of the bar for clamping a support therebetween, a sill bracket at one end of the bar, said bracket having a base and sidewalls secured to the base along opposite edges thereof, said sidewalls extending substantially upright from the base, and clamp means mounted on the opposite end of the bar having a pushrod movable toward the sill bracket.

13. In a fixture for assembling stud members and sill members to form a wood frame, a sill holder comprising an elongated bar, a clamp on each opposite end thereof having a clamping member cooperating with one side of the bar for clamping a support therebetween, said bar having openings therein at opposite ends of the bar on the side adjacent the clamps, a pin mounted in the bar for reciprocating movement into and out of the opening, spring means for urging the pin out of the opening, a sill bracket at one end of the bar and clamp means mounted on the opposite end of the bar having a pushrod movable toward the sill bracket.

14. In a fixture for assembling stud members and still members to form a wood frame, a stud holder comprising an elongated bar, a clamp on each opposite end thereof having a clamping member cooperating with one side of the bar for clamping a support therebetween, a stud bracket, and means for securing the bracket to the bar.

15. In a fixture for assembling stud members and sill members to form a wood frame, a stud holder comprising an elongated bar, a clamp on each opposite end thereof having a clamping member cooperating with one side of the bar for clamping a support therebetween, a stud bracket, said bracket having an elongated base, pins secured in upstanding relation on opposite ends of the base, and means for securing the base to the bar.

16. In a fixture for assembling stud members and sill members to form a wood frame, a stud holder comprising an elongated bar, a clamp on each opposite end thereof having a clamping member cooperating with one side of the bar for clamping a support therebetween, a stud bracket, said bracket having an elongated base, pins secured in upstanding relation on opposite ends of the base, a peg secured in the base, said pins extending from one side of the base and said peg extending from the opposite side of the base, and means for securing said opposite side of the base against the bar, whereby the peg cooperated with the bar for orienting the stud bracket.

17. In a fixture for assembling stud members and sill members to form a wood frame, a stud holder comprising an elongated bar, a clamp on each opposite end thereof having a clamping member cooperating with one side of the bar for clamping a support therebetween, a stud bracket, said bracket having an elongated base, pins secured in upstanding relation on opposite ends of the base, a peg secured in the base, said pins extending from one side of the base and said peg extending from the opposite side of the base, a bolt extending through the bar and being threaded to the base, and spring means urging said base against the bar, said bar having a hole therein adjacent the bolt, said pin being spaced from the bolt whereby the pin engages an edge of the bar when the base extends transversely of the bar and the pin engages the hole in the bar when the base extends obliquely of the bar for holding double and single stud members, respectively.

18. In a fixture for assembling stud members and sill members to form a wood frame, a holder for the members comprising an elongated bar, a clamp on each opposite end thereof having a clamping member cooperating with one side of the bar for clamping a portion of a support structure therebetween, said bar having an opening therein on the side of the bar adjacent the clamps, a rod mounted in the bar for reciprocating movement into and out of the opening, spring means for urging the rod out of the opening, means on said support structure forming a socket for receiving said rod projecting out of said opening, a member receiving bracket, and means for securing the bracket to the bar, whereby said rod positions said bar relative to said support structure.

References Cited by the Examiner

UNITED STATES PATENTS

| | | | |
|---|---|---|---|
| 689,061 | 8/1901 | Bromm | 144—288 |
| 789,906 | 8/1904 | Gordon | 269—228 |
| 2,749,873 | 3/1954 | Huffman | 144—288 |
| 2,919,733 | 8/1956 | Johnson | 269—321 |
| 3,036,609 | 5/1959 | Quesenberry | 144—288 |

ANDREW R. JUHASZ, *Primary Examiner.*

WILLIAM W. DYER, Jr., R. J. ZLOTNIK,
*Assistant Examiners.*